US012689105B2

(12) United States Patent
Lee et al.

(10) Patent No.: US 12,689,105 B2
(45) Date of Patent: Jul. 21, 2026

(54) APPARATUS AND METHOD FOR REMOVING RESIDUAL ELECTROLYTE FROM A SECONDARY BATTERY

(71) Applicant: SAMSUNG SDI CO., LTD., Yongin-si (KR)

(72) Inventors: Tae Yoon Lee, Yongin-si (KR); Woo Hyuk Choi, Yongin-si (KR); Bong Geun Kang, Yongin-si (KR); Young Ho Kim, Yongin-si (KR); Seung Man Lim, Yongin-si (KR); Hyun Suk Park, Yongin-si (KR); Jun Ho Yang, Yongin-si (KR); Jun Hwan Kwon, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 120 days.

(21) Appl. No.: 18/673,281

(22) Filed: May 23, 2024

(65) Prior Publication Data

US 2025/0183503 A1     Jun. 5, 2025

(30) Foreign Application Priority Data

Dec. 1, 2023     (KR) ........................ 10-2023-0172071

(51) Int. Cl.
*H01M 50/691*          (2021.01)
*B08B 1/14*             (2024.01)
*B08B 1/30*             (2024.01)

(52) U.S. Cl.
CPC ............. *H01M 50/691* (2021.01); *B08B 1/14* (2024.01); *B08B 1/30* (2024.01)

(58) Field of Classification Search
None
See application file for complete search history.

(56) References Cited

U.S. PATENT DOCUMENTS 5,654,114 A  *  8/1997  Kubota ................. H01M 4/485
                                                      429/94
2011/0072648 A1    3/2011  Yamauchi
                           (Continued)

FOREIGN PATENT DOCUMENTS

JP          2001-110452 A       4/2001
JP          2020-187937 A      11/2020
                           (Continued)

OTHER PUBLICATIONS

Google Patents translation of JP2001110452A (Year: 2025).*
                           (Continued)

*Primary Examiner* — Eric W Golightly
(74) *Attorney, Agent, or Firm* — Venable LLP

(57)          ABSTRACT

An apparatus configured to remove a residual electrolyte from a beading part of a case of a cylindrical secondary battery, the case being configured to prevent or reduce separation of an electrode assembly. The apparatus includes an electrolyte absorption member providing part configured to provide an electrolyte absorption member to the case, a case moving part for coupling to the electrode assembly, wherein the case moving part is configured to move the case after the case has received an injection of an electrolyte, and an absorption member moving part configured to move an area of the electrolyte absorption member onto the beading part of the case to absorb at least some of the residual electrolyte from the beading part.

11 Claims, 7 Drawing Sheets

(56) References Cited

U.S. PATENT DOCUMENTS

| | | | | | |
|---|---|---|---|---|---|
| 2023/0077235 A1* | 3/2023 | Mori | ........................ | D04H 1/435 | |
| 2023/0147796 A1* | 5/2023 | Rhee | ......................... | C09J 7/383 | |
| | | | | | 427/58 |

FOREIGN PATENT DOCUMENTS

| | | | |
|---|---|---|---|
| KR | 10-2011-0035859 A | 4/2011 | |
| KR | 10-2022-0115331 A | 8/2022 | |

OTHER PUBLICATIONS

Jan. 30, 2025 Extended European Search Report in European Patent Application No. 24 19 2125, 10 pages.
Heimes et al., Production Process of Lithium-Ion Battery Cell, Apr. 19, 2023, 25 pages.

* cited by examiner

PRIOR ART

PRIOR ART

APPARATUS AND METHOD FOR REMOVING RESIDUAL ELECTROLYTE FROM A SECONDARY BATTERY

CROSS-REFERENCE TO RELATED APPLICATION

The present application claims priority to and the benefit of Korean Patent Application No. 10-2023-0172071, filed on Dec. 1, 2023, in the Korean Intellectual Property Office, the entire disclosure of each of which is incorporated herein by reference.

BACKGROUND

1. Field

The disclosure relates to an apparatus for and method of removing an electrolyte from a case during a process of manufacturing a secondary battery.

2. Description of the Related Art

A cylindrical secondary battery includes a cylindrical electrode assembly, a cylindrical case (or can) accommodating the electrode assembly and an electrolyte, and a cap assembly coupled to an opening of one side of the can to seal the case and electrically connected to the electrode assembly to electrically connect an external component to the electrode assembly.

The process of manufacturing the cylindrical secondary battery includes inserting a process of forming a beading part in a case to inject an electrolyte after inserting the electrode assembly into the cylindrical case. The electrolyte may remain in the beading part, and the residual electrolyte may cause damage to a current collector, a gasket, a cap plate, etc. that are coupled to the beading part depending on the electrolyte injection process. In particular, if the beading part having a wide flat area is formed, an amount of residual electrolyte accumulated in the beading part may increase to cause dimensional abnormalities after molding, contamination of an upper portion of the case, contaminations of molding equipment, etc., thereby causing difficulties for continuous production, etc. Thus, it is desirable to remove the electrolyte remaining in the case, e.g., the beading part of the case, after the electrolyte injection.

The above-described information disclosed in the technology that serves as the background of the present disclosure is only for improving understanding of the background of the present disclosure and thus may include information that does not constitute the related art.

SUMMARY

Aspects of some embodiments of the present disclosure provide a method for effectively removing an electrolyte remaining in a beading part of a cylindrical secondary battery.

According to some embodiments, an apparatus is configured to remove a residual electrolyte from a beading part of a case of a cylindrical secondary battery, the case may be configured to prevent separation of an electrode assembly. The apparatus may comprise an electrolyte absorption member providing part configured to provide an electrolyte absorption member to the case, a case moving part configured to move the case after the case has received an injection of an electrolyte, and an absorption member moving part configured to move an area of the electrolyte absorption member onto the beading part of the case to absorb at least some of the residual electrolyte from the beading part.

The electrolyte absorption member may include nonwoven fabric.

The electrolyte absorption member providing part may be configured to move the electrolyte absorption member by unwinding the electrolyte absorption member from an unwinding roll so as to be wound around a winding roll.

The electrolyte absorption member may include a flat plate sheet or uneven sheet into which the electrolyte is absorbed.

The case moving part may include a case rotation part configured to rotate the case.

The case moving part may be configured to move the case in a first direction, and the absorption member moving part may include a jig configured to move the electrolyte absorption member in a second direction that is orthogonal to the first direction.

The jig may be configured to rotated.

A bottom surface of the jig may be flat.

A lower end of the jig may have a protruding blade shape.

According to some embodiments, a method is provided for removing a residual electrolyte from a case including an electrolyte, an electrode assembly, and a beading part. The method comprises moving the case to contact an electrolyte absorption member, and moving an area of the electrolyte absorption member onto the beading part to absorb the residual electrolyte on the beading part.

The electrolyte absorption member may include nonwoven fabric.

The electrolyte absorption member may move in a roll-to-roll manner to provide the electrolyte absorption member.

The electrolyte absorption member may include a flat plate sheet or uneven sheet for absorbing the electrolyte.

Rotation of the case may be performed together with linear movement of the case.

The case may move in a first direction, and the electrolyte absorption member may move in a second direction that is orthogonal to the first direction.

Moving an area of the electrolyte absorption member may include rotating a jig.

A bottom surface of the jig may be flat.

A lower end of the jig may have a protruding blade shape.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain principles of the present disclosure.

DETAILED DESCRIPTION

Figure 1:
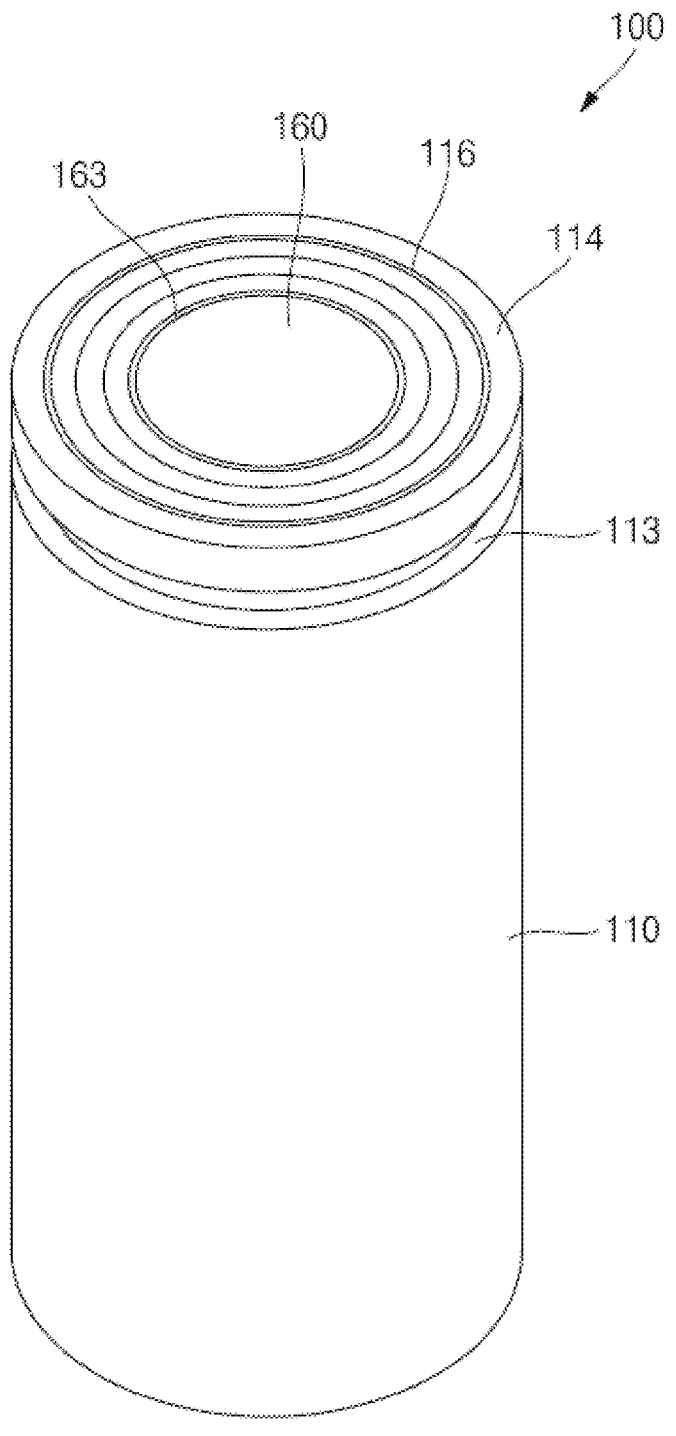
FIG. 1 illustrates a perspective view illustrating an example of a cylindrical secondary battery to which an apparatus for and method of removing a residual electrolyte may be applied according to some embodiments.

Hereinafter, embodiments will be described in detail with reference to the accompanying drawings.

Embodiments of the present disclosure may, however, be embodied in many different forms and should not be construed as being limited to the embodiments set forth herein; rather, these embodiments are provided so that those skilled in the art thoroughly understand the present disclosure. Rather, these embodiments are provided so that this disclosure will be thorough and complete, and will fully convey the scope of the present disclosure to those skilled in the art.

In addition, in the following drawings, the thickness or size of each layer is exaggerated for convenience and clarity of description, and the same reference numerals in the drawings refer to the same elements. As used herein, the term "and/or" includes any and all combinations of one or more of the associated listed items. In this specification, it will also be understood that if a member A is referred to as being connected to a member B, the member A can be directly connected to the member B or indirectly connected to the member B with a member B therebetween.

The terms used in this specification are for illustrative purposes of the present disclosure only and should not be construed to limit the meaning or the scope of the present disclosure. As used in this specification, a singular form may, unless definitely indicating a particular case in terms of the context, include a plural form. Also, the expressions "comprise" and/or "comprising" used in this specification neither define the mentioned shapes, numbers, processes, operations, members, elements, and/or groups of these, nor exclude the presence or addition of one or more other different shapes, numbers, processes, operations, members, elements, and/or groups of these, or addition of these. The term "and/or" used herein includes any and all combinations of one or more of the associated listed items.

As used herein, terms such as "first," "second," etc. are used to describe various members, components, areas, layers, and/or portions. However, it is obvious that the members, components, areas, layers, and/or portions should not be defined by these terms. The terms do not mean a particular order, up and down, or superiority, and are used only for distinguishing one member, component, region, layer, or portion from another member, component, region, layer, or portion. Thus, a first member, component, region, layer, or portion which will be described may also refer to a second member, component, region, layer, or portion, without departing from the teaching of the present disclosure.

Spatially relative terms, such as "below", "beneath", "lower", "above", "upper" and the like, used herein for ease of description to describe one element or feature's relationship to another element(s) or feature(s) as illustrated in the figures. These spatially relative terms are intended for easy comprehension of the prevent invention according to various process states or usage states of the prevent invention, and thus, the present disclosure is not limited thereto. For example, an element or feature shown in the drawings is turned inside out, the element or feature described as "beneath" or "below" may change into "above" or "upper". Thus, the term "below" may encompass the term "above" or "below".

Figure 2:
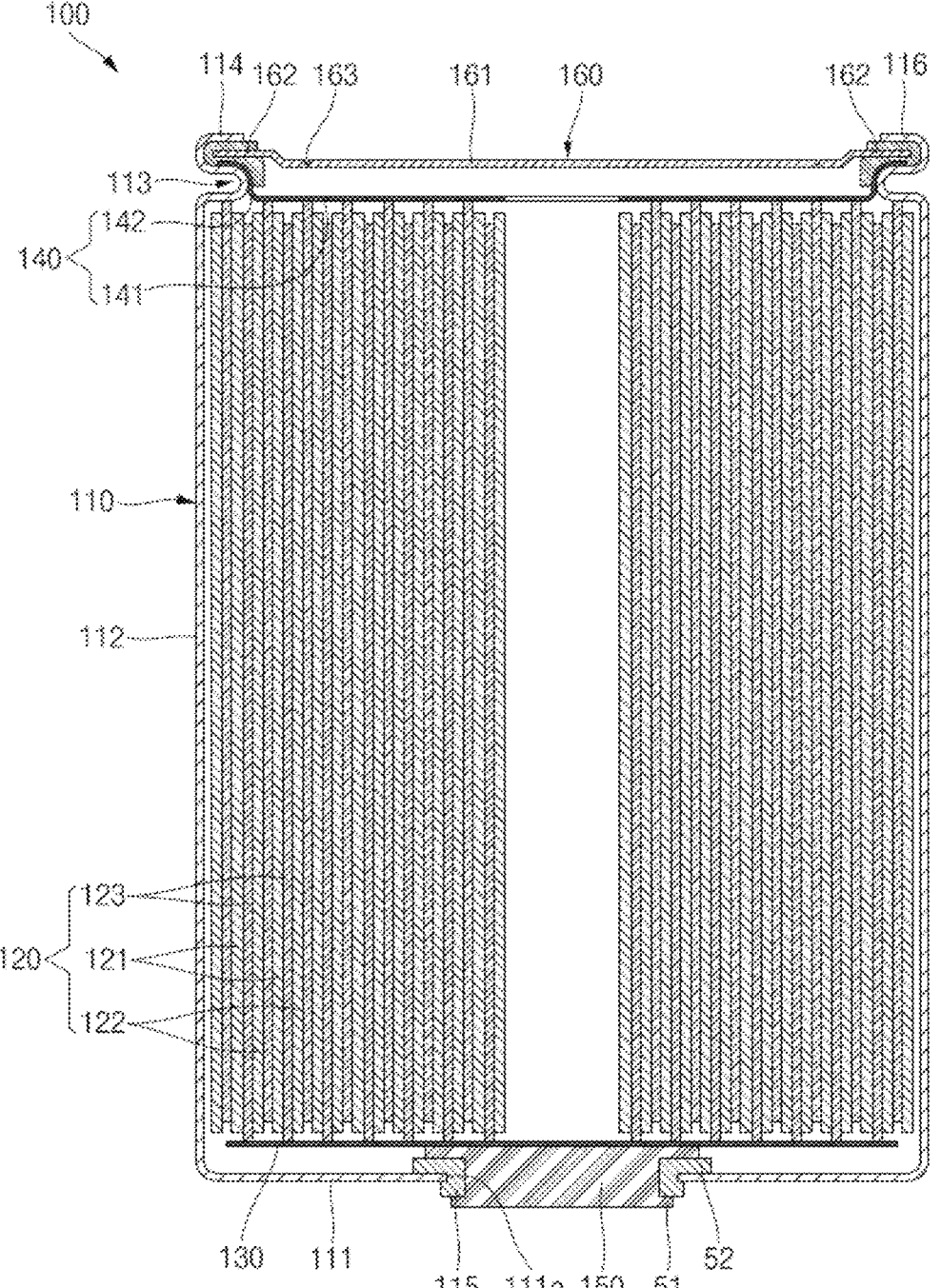
FIG. 2 illustrates a cross-sectional view of the cylindrical secondary battery of FIG. 1.

FIG. 1 illustrates a perspective view of an example of a cylindrical secondary battery to which an apparatus and method for removing a residual electrolyte are applied according to some embodiments. FIG. 2 illustrates a cross-sectional view of the cylindrical secondary battery of FIG. 1.

Referring to FIGS. 1 and 2, a cylindrical secondary battery 100 may include a case 110, an electrode assembly 120 inside the case 110, a terminal 150 coupled to a terminal hole 111*a* defined in one end, e.g., a lower end, of the case 110, and a cap plate 160 that seals an opening defined in an opposite end, e.g., an upper end, of the case 110.

The case 110 may include a circular bottom part 111 and a side part 112 extending a predetermined length upward from an edge of the bottom part 111. The bottom part 111 and the side part 112 of the case 110 may be integrated with each other.

The circular bottom part 111 may have a flat circular plate shape and may be provided with a terminal hole 111*a* passing through a central portion of the circular bottom part 111. The terminal 150 may be inserted into and coupled to the terminal hole 111*a* of the bottom part 111. A first gasket 115 for sealing and electrical insulation may be further interposed between the terminal hole 111*a* and the terminal 150. The first gasket 115 may block contact between the terminal 150 and the case 110 to electrically separate the terminal 150 and the case 110 from each other. The terminal hole 111*a* of the bottom part 111 of the case 110 may be sealed by the first gasket 115. The first gasket 115 may be made of a resin material such as polyethylene (PE), polypropylene (PP), polyethylene terephthalate (PET), or the like.

In the cylindrical secondary battery 100, an upper portion of the case 110 may be opened during a manufacturing process. In some embodiments, during a process of manufacturing the cylindrical secondary battery 100, the electrode assembly 120 and an electrolyte may be inserted through an opened upper portion of the case 110. As described above, after the electrolyte and the electrode assembly 120 are inserted into the case 110, the cap plate 160 may be coupled to the opened upper portion to seal the inside of the case 110. Here, the electrolyte may serve to facilitate movement of lithium ions between a positive electrode plate 121 and a negative electrode plate 122, which constitute the electrode assembly 120. The electrolyte may be a non-aqueous organic electrolyte such as a mixture of lithium salt and a high-purity organic solvent. Furthermore, the electrolyte may be a polymer using a polymer electrolyte or a solid electrolyte, and the type of the electrolyte is not limited.

The case 110 may be made of steel, a steel alloy, aluminum, an aluminum alloy, or an equivalent thereof, but the material thereof is not limited thereto. In some embodiments, a beading part 113 recessed inward may be defined in the case 110 at a lower portion of the can 110 with respect to the cap plate 160 to prevent the cap assembly 140 from being separated to the outside. In some embodiments, a inwardly bent crimping part 114 may be provided at an upper portion of the can 110. After the electrode assembly 120 is inserted through the opened lower end of the case 110, the beading part 113 may be provided to prevent the electrode assembly 120 from being separated from the case 110.

The electrode assembly 120 may include a first electrode plate 121, a second electrode plate 122, and a separator 123. The first electrode plate 121 may be a positive electrode plate, and the second electrode plate 122 may be a negative electrode plate, or vice versa. Hereinafter, for convenience of description, the first electrode plate 121 will be referred to as the positive electrode plate, and the second electrode plate 122 will be referred to as the negative electrode plate.

The first electrode plate 121 may be provided by applying a positive electrode active material made of transition metal oxide on at least one surface of plate-shaped metal foil made of aluminum (Al). In some embodiments, the first electrode plate 121 may be provided with a positive electrode non-coating portion, which is not coated with the positive electrode active material, on a lower end thereof. The positive electrode non-coating portion may protrude downward from the electrode assembly 120. In some embodiments, the positive electrode non-coating portion may further protrude downward than the second electrode plate 122 and the separator 123.

The second electrode plate 122 may be coated with a negative electrode active material such as graphite or carbon on at least one surface of plate-shaped metal foil made of copper (Cu) or nickel (Ni). In some embodiments, the second electrode plate 122 may be provided with a negative electrode non-coating portion, which is not coated with the negative electrode active material, on an upper end thereof. The negative electrode non-coating portion may protrude toward an upper side of the electrode assembly 120. In some embodiments, the negative electrode non-coating portion of the second electrode plate 122 may further protrude upward than the first electrode plate 121 and the separator 123.

The separator 123 may be made of a material such as polyethylene (PE) or polypropylene (PP), but the embodiments are not limited thereto. The separator 123 may be disposed between the first electrode 121 and the second electrode 122 to prevent a short circuit while allowing movement of lithium ions.

The electrode assembly 120 may be wound from a winding front end in a substantially cylindrical shape after the first electrode plate 121, the second electrode plate 122, and the separator 123 are stacked. In some embodiments, in the electrode assembly 120, the positive electrode non-coating portion that is not coated with the positive electrode active material may protrude downward from the first electrode plate 121, and the negative electrode non-coating portion that is not coated with the negative electrode active material may protrude upward from the second electrode plate 122.

A first current collector plate 130 may be a circular metal plate having a shape corresponding to a bottom surface of the electrode assembly 120. A planar size of the first current collector plate 130 may be equal to or less than a size of the bottom surface of the electrode assembly 120. The first current collector plate 130 may be made of aluminum (Al). The first current collector plate 130 may be fixed and electrically connected to the first electrode plate 121 exposed to the lower side of the electrode assembly 120, e.g., by welding the top surface of the first current collector plate 130 in contact with the bottom surface of the electrode assembly 120. The first current collector plate 130 may be fixed and electrically connected to the terminal 150 through welding in a state in which the bottom surface of the first current collector plate 130 is in contact with the top surface of the terminal 150. The first current collector plate 130 may serve as a path for a current flow between the first electrode plate 121 of the electrode assembly 120 and the terminal 150.

The second current collector plate 140 may include a circular planar part 141 corresponding to the top surface of the electrode assembly 120 and an extension part 142 extending upward from an edge of the planar part 141.

The planar part 141 may have a circular plate shape corresponding to the shape of the top surface of the electrode assembly 120, and a bottom surface of the planar part 141 may be in contact with the top surface of the electrode assembly 120. The bottom surface of the planar part 141 may be fixed and electrically connected to the second electrode plate 122 exposed to the upper side of the electrode assembly 120, e.g., by welding, so as to be in contact with the top surface of the electrode assembly 120.

The extension part 142 may extend upward from an edge of the planar part 141. The extension part 142 may be in contact with and may be coupled to the beading part 113 of the case 110. In some embodiments, the extension part 142 may be welded in contact with an inner surface of the beading part 113 of the case 110. In some embodiments, the extension part 142 may be provided as a plurality of parts spaced apart from each other along the edge of the planar part 141. The second current collector plate 140 may serve as a path for current to flow between the second electrode plate 122 of the electrode assembly 120 and the case 110. In some embodiments, the case 110 may be a negative electrode terminal.

The terminal 150 may be inserted into a terminal hole 111a provided in the bottom part 111 of the case 110 and electrically connected to the first electrode collector plate 130. In some embodiments, the terminal 150 may be a positive electrode terminal. The terminal 150 and the case 110 may have different polarities. The terminal 150 may be made of the same or similar material as each of the first current collector plate 130 and the first electrode plate 121. In the terminal 150, a diameter of a portion of the terminal 150 that is exposed to a lower side of the case 110, and/or a diameter disposed inside the case 110, may be greater than a diameter of the terminal 150 disposed in the terminal hole 111a.

The terminal 150 may include a head 51, which is a portion exposed to the lower side of the case 110, and a coupling part 52, which is a portion disposed inside the case 110 to face the electrode assembly 120. The terminal 150 may be coupled to the terminal hole 111a of the case 110 inward from the outside. In some embodiments, the head 51 may be disposed outside the case 110. In some embodiments, the coupling part 52 may be compressed and deformed (e.g., compressed and molded) by riveting. Thus, the first gasket 115 may be pressed in an upper portion of the bottom part 111. In some embodiments, the head 51 may be in contact with the lower portion of the bottom part 111 with the first gasket 115 therebetween. In some embodiments, the first gasket 115 may be interposed between the terminal 150 and the terminal hole 111a to electrically insulate the terminal 150 and the case from each other and seal the terminal 150 and the case 110. The terminal 150 may be electrically connected to the first electrode plate 121 of the electrode assembly 120 through the first current collector plate 130.

With the above-described structure, the first current collector plate 130 may serve as a path for current to flow between the first electrode plate 121 of the electrode assembly 120 and the terminal 150. In some embodiments, the terminal 150 may be a positive electrode terminal.

The cap plate 160 may be provided as a circular metal plate and may be coupled to an upper end of the case 110. A top surface of the cap plate 160 may be exposed to the outside. The cap plate 160 may be coupled to the upper end of the case 110 such that the second gasket 116 prevents electrical contact with the case 110. Because the cap plate 160 is not electrically connected to the positive electrode or the negative electrode of the electrode assembly 120, there may be no separate electrical polarity. The cap plate 160 may be made of aluminum, an aluminum alloy, or equivalent. The cap plate 160 may be provided as a metal plate and have a thickness of about 0.2 mm to about 1.5 mm.

The cap plate 160 may include a center area 161 and an edge area 162, and the edge area 162 of the cap plate 160 may be disposed between the beading part 113 of the case 110 and the crimping part 114. In some embodiments, the cap plate 160 may be seated on an upper portion such that the second gasket 116 is disposed on an upper portion of the beading part 113 of the case 110. Thereafter, the crimping part 114 of the case 110 may be bent to the inside of the cap plate 160 in a radial direction to press the second gasket 116, thereby fixing the cap plate 160 to the case 110. The second gasket 116 may be made of a resin material such as polyethylene (PE), polypropylene (PP), polyethylene terephthalate (PET), or the like. The second gasket 116 may press the case 110 and the cap plate 160 to seal a gap between the case 110 and the cap plate 160, thereby preventing the cap plate 160 from being separated from the case 110.

The cap plate 160 may include a vent 163 defined in the central area 161 so as to be opened by a breaking pressure. The vent may be a notch defined from a top surface to a bottom surface of the cap plate 160.

Figure 3:
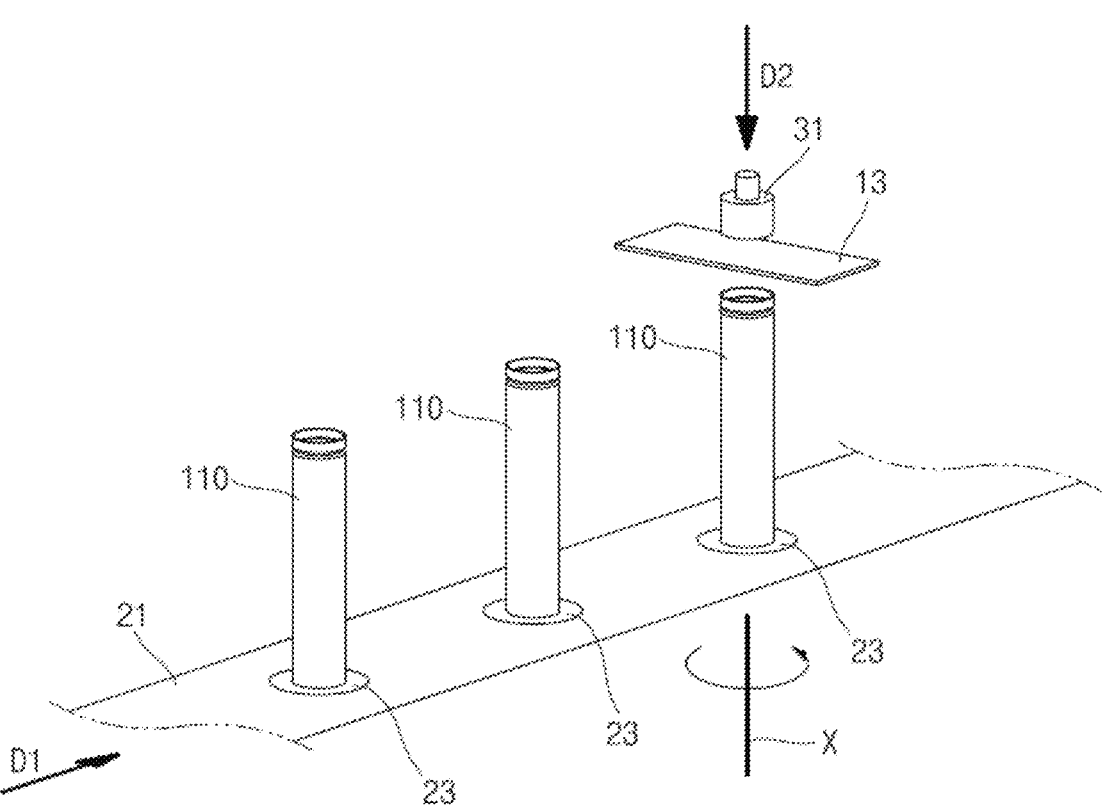
FIG. 3 illustrates a schematic view of the apparatus for removing the residual electrolyte according to some embodiments.
Figure 4:
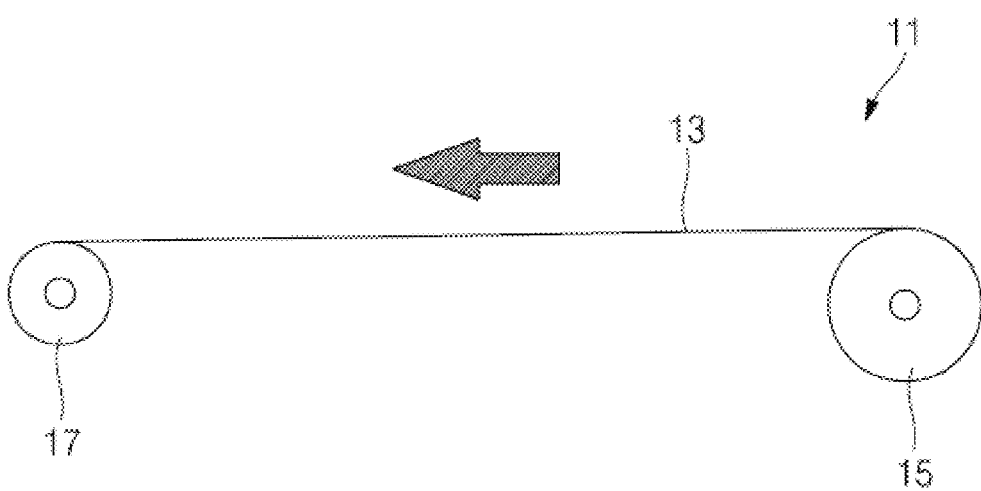
FIG. 4 illustrates a schematic view of an electrolyte absorption member providing part of the apparatus for removing the residual electrolyte according to some embodiments.

FIG. 3 illustrates a schematic view of the apparatus for removing the residual electrolyte according to embodiments, and FIG. 4 illustrates a schematic view of an electrolyte absorption member providing part of the apparatus for removing the residual electrolyte according to some embodiments.

Referring to FIG. 4, the electrolyte absorption member providing part 11 may provide an electrolyte absorption member 13 capable of absorbing the electrolyte remaining in the case 110, e.g., electrolyte remaining in the beading part 113 of the case 110. The electrolyte absorption member 13 may be a nonwoven fabric capable of absorbing the electrolyte, and the electrolyte absorption member providing part 11 may be configured to sequentially supply a nonwoven fabric extending length-wise in a roll-to-roll manner. In some embodiments, as illustrated in FIG. 4, the electrolyte absorption member providing part 11 may include an unwinding roll 15 configured to unwind the electrolyte absorption member, i.e., the nonwoven fabric 13, and a winding roll 17 configured to wind the nonwoven fabric 13 from the unwinding roll 15. The nonwoven fabric 13 may be supplied while moving in a direction of the arrow depicted in FIG. 4 by rotation of the unwinding roll 15 and the winding roll 17.

The electrolyte absorption member 13 may have a shape of a flat sheet or a shape of uneven sheet and electrolyte absorption member 13 may be capable of absorbing the electrolyte.

The case moving part 21 may be configured to move the case 110 in a first direction D1. For example, as schematically illustrated in FIG. 3, the case moving part 21 may be configured to sequentially move the cases 110 to an area on which an electrolyte absorption process is performed. For example, the case moving part 21 may be configured to move the cases 110 in which the electrode assembly 120 is coupled, the beading part 113 is provided, and the electrolyte is injected. The case moving part 21 may be implemented using various driving devices capable of moving the case 110, such as a conveyor belt-based device or a robot device. In some embodiments, the case moving part 21 may include a rotation part 23 configured to rotate the case 110 about a rotating axis X.

Figure 5:
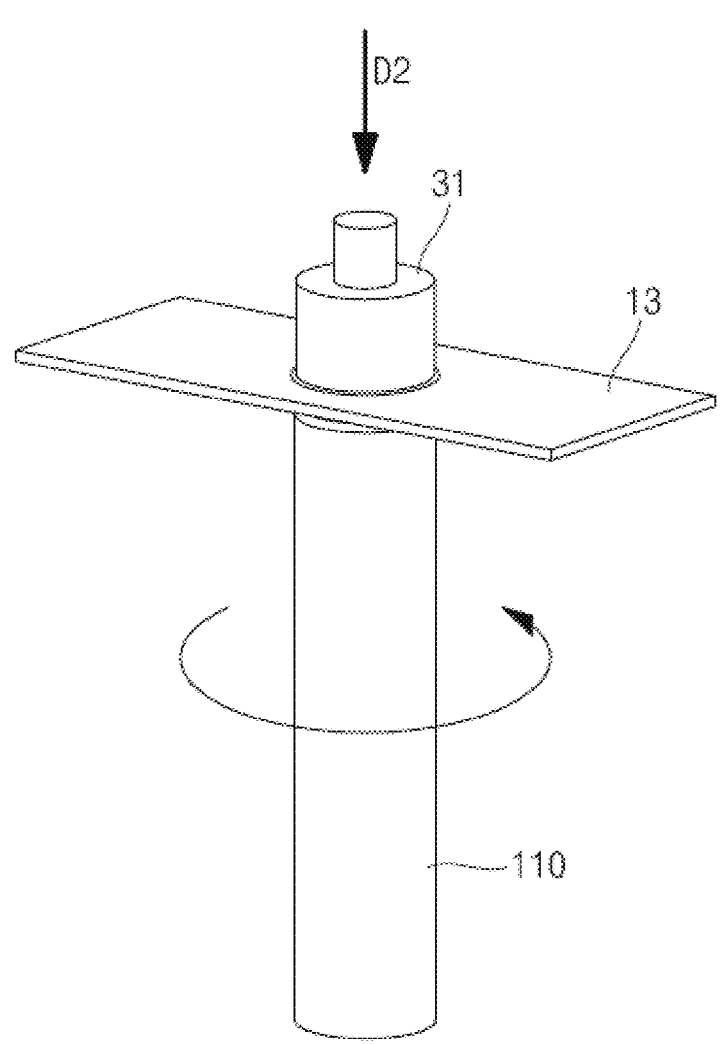
FIG. 5 illustrates a view of a state in which a jig of the apparatus for removing the residual electrolyte presses nonwoven fabric according to some embodiments.

The electrolyte absorption member moving part 31 may be configured to move the nonwoven fabric 13 in a vertical direction D2 of the case 110. The electrolyte absorption member moving part 31 may include a jig configured to move in the vertical direction D2 of the case 110. The jig 31 may be configured to move in the vertical direction by an actuator and may be configured to be at least partially inserted into the case 110 while moving downward in FIG. 3 to press the nonwoven fabric 13. That is, as illustrated in FIG. 5, the jig 31 may move in the downward direction D2 to press the nonwoven fabric 13, thereby causing deformation, that is, movement of the nonwoven fabric 13. Thus, the nonwoven fabric 13 may be folded to the beading part 113 within the case 110. As a result, the electrolyte remaining in the beading part 113 may be absorbed into the nonwoven fabric 13. In some embodiments, a lower end of the jig 31 that is in contact with the nonwoven fabric 13 may be provided to be flat, thereby increasing in contact area with the nonwoven fabric 13, and as a result, absorption of the electrolyte may be promoted. In some embodiments, the case 110 may rotate in the direction of the arrow to promote the absorption of the residual electrolyte.

Figure 6:
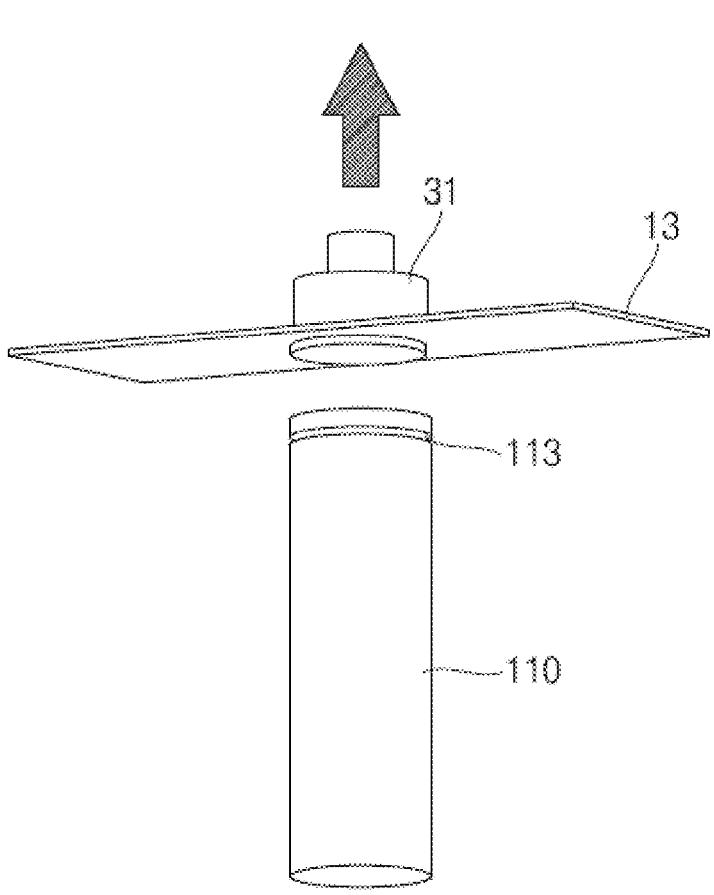
FIG. 6 illustrates a view of a state in which a jig of the apparatus for removing the residual electrolyte moves vertically so that the nonwoven fabric returns to its original position according to some embodiments.

After the absorption of the residual electrolyte is achieved, the jig 31 may move upward as indicated by an arrow as illustrated in FIG. 6. Thus, the nonwoven fabric 13 may return to the position that the nonwoven fabric 13 was in before the pressing. In some embodiments, the residual electrolyte in the case 110 may be removed, and the case moving part 21 may move under the jig 31 of the next case 110. In some embodiments, the nonwoven fabric 13 may move by the operation of the unwinding roll 15 and the winding roll 15, thereby moving the portion of the nonwoven fabric 13 that absorbs the electrolyte. Then, the electrolyte may be absorbed again by moving the jig 31 downward.

Figure 7:
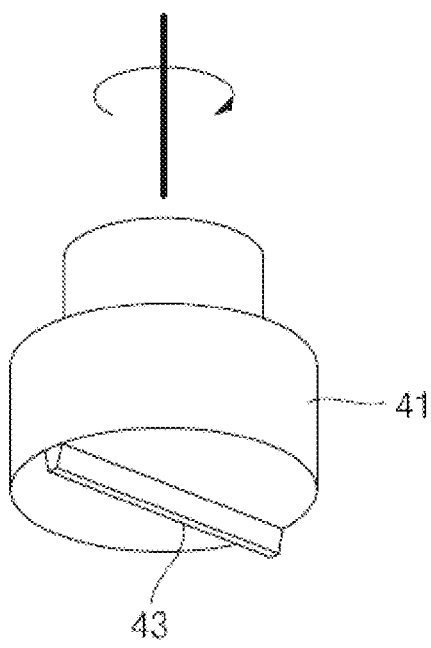
FIG. 7 illustrates a view of a jig of an apparatus for removing a residual electrolyte according to some embodiments.

FIG. 7 illustrates a view of a jig of an apparatus for removing a residual electrolyte according to other embodiments. As illustrated in FIG. 7, a lower end of the jig 41 may include a protruding blade 43. The jig 41 may be configured to be movable in a vertical direction, similar to the embodiment described above. The protruding blade 43 may implement a structure that is capable of effectively pressing a nonwoven fabric 13. In some embodiments, the jig 41 may be configured to rotate in a direction of an arrow around a vertical axis. The nonwoven fabric 13 may be effectively pressed through rotation of the jig 41 having the protruding blade 43, and thus, an electrolyte remaining in a beading part 113 may be effectively absorbed. The jig 41 may not rotate, but a case 110 accommodating an electrode assembly 120 may rotate instead of the jig 41. In some embodiments, as the case 110 rotates, the electrolyte remaining in the beading part 113 may be effectively absorbed. In some examples, the jig 41 may rotate in a first direction, and the case 110 may rotate in a second direction opposite to the first direction, and thus, the electrolyte remaining in the beading part 113 may be more effectively absorbed into a nonwoven fabric 13.

According to the embodiments of the present disclosure, the electrolyte remaining in the beading part of the cylindrical secondary battery may be removed through the residual electrode absorption device including the electrode absorption member providing part, the case moving part, and the electrode absorption member moving part.

The above-mentioned embodiment is merely an embodiment of the cylindrical secondary battery, and thus, the present disclosure is not limited to the foregoing embodiment, and also it will be understood by those of ordinary skill in the art that various changes in form and details may be made therein without departing from the spirit and scope of the present disclosure as defined by the following claims.

What is claimed is:

1. An apparatus configured to remove a residual electrolyte from a beading part of a case of a cylindrical secondary battery, wherein the case is configured to prevent separation of an electrode assembly, the apparatus comprising:

an electrolyte absorption member providing part configured to provide an electrolyte absorption member to the case;

a case moving part configured to move the case after the case has received an injection of an electrolyte; and an absorption member moving part configured to move an area of the electrolyte absorption member onto the beading part of the case to absorb at least some of the residual electrolyte from the beading part, wherein the case moving part is configured to move the case in a first direction, and wherein the absorption member moving part is configured to move the electrolyte absorption member in a second direction that is orthogonal to the first direction.

2. The apparatus as claimed in claim 1, wherein the electrolyte absorption member comprises a nonwoven fabric.

3. The apparatus as claimed in claim 1, further comprising an unwinding roll and a winding roll, wherein the electrolyte absorption member providing part is configured to unwind the electrolyte absorption member from the unwinding roll and wind the electrolyte absorption member around the winding roll.

4. The apparatus as claimed in claim 1, wherein the electrolyte absorption member comprises a flat plate sheet or uneven sheet for absorbing the electrolyte.

5. The apparatus as claimed in claim 1, wherein the case moving part comprises a case rotation part configured to rotate the case.

6. The apparatus as claimed in claim 1, wherein the absorption member moving part comprises a jig configured to move the electrolyte absorption member in the second direction.

7. The apparatus as claimed in claim 6, wherein the jig is configured to be rotatable.

8. The apparatus as claimed in claim 6, wherein a bottom surface of the jig is flat.

9. The apparatus as claimed in claim 6, wherein a lower end of the jig has a protruding blade shape.

10. The apparatus as claimed in claim 9, wherein the jig is configured to be rotatable.

11. An apparatus configured to remove a residual electrolyte from a beading part of a case of a cylindrical secondary battery, wherein the case is configured to prevent separation of an electrode assembly, the apparatus comprising:

a roll configured to provide an electrolyte absorption member to the case;

a case moving part including a conveyor or a robot, the case moving part being configured to move the case after the case has received an injection of an electrolyte; and a jig configured to move an area of the electrolyte absorption member onto the beading part of the case to absorb at least some of the residual electrolyte from the beading part, wherein the case moving part is configured to move the case in a first direction, and wherein the jig is configured to move the electrolyte absorption member in a second direction that is orthogonal to the first direction.

* * * * *